U S010108527B2

United States Patent
Thayer (10) Patent No.: US 10,108,527 B2
(45) Date of Patent: *Oct. 23, 2018

(54) DEBUGGING USING PROGRAM STATE DEFINITIONS

(71) Applicant: CA, Inc., New York, NY (US)

(72) Inventor: Kyle Lee Joseph Thayer, Windsor, CO (US)

(73) Assignee: CA, Inc., New York, NY (US)

( * ) Notice: Subject to any disclaimer, the term of this patent is extended or adjusted under 35 U.S.C. 154(b) by 77 days.

This patent is subject to a terminal disclaimer.

(21) Appl. No.: 15/224,181

(22) Filed: Jul. 29, 2016

(65) Prior Publication Data

US 2016/0378639 A1  Dec. 29, 2016

Related U.S. Application Data

(63) Continuation of application No. 14/748,056, filed on Jun. 23, 2015, now Pat. No. 9,430,358.

(51) Int. Cl.
*G06F 11/36* (2006.01)

(52) U.S. Cl.
CPC ...... *G06F 11/3636* (2013.01); *G06F 11/3664* (2013.01); *G06F 11/3688* (2013.01); *G06F 11/3692* (2013.01)

(58) Field of Classification Search
CPC ............. G06F 11/3688; G06F 11/3664; G06F 11/3636
USPC ....................................................... 717/124
See application file for complete search history.

(56) References Cited

U.S. PATENT DOCUMENTS

| 7,603,589 | B2 * | 10/2009 | Swoboda | G06F 11/3636 714/45 |
| 9,430,358 | B1 * | 8/2016 | Thayer | G06F 11/3688 |
| 2003/0204374 | A1 * | 10/2003 | Madsen | G06F 11/3466 702/186 |
| 2006/0143596 | A1 * | 6/2006 | Miyashita | G06F 8/433 717/131 |
| 2007/0186195 | A1 | 8/2007 | Ng et al. | |
| 2014/0075255 | A1 * | 3/2014 | Lee | G01R 31/3177 714/727 |
| 2014/0173567 | A1 | 6/2014 | Krauss et al. | |

OTHER PUBLICATIONS

SAP, "Dynamic Breakpoints", Obtained from internet: help.sap.com/saphelp_nw70ehp2/helpdata/en/49/19eb9669cd3896e10000000a421937/content.htm (May 20, 2015), Jan. 22, 2014, 1 page.

(Continued)

*Primary Examiner* — John Chavis
(74) *Attorney, Agent, or Firm* — Gilliam IP PLLC (57) ABSTRACT

A program state definition comprises target values that correspond to problematic or unexpected output of a program. A debugger compares the target values of the program state definition to variable values of a program and stops execution of a program at a point where all target values are contained in variables of the program. By stopping execution of a program, the debugger allows a programmer to analyze the program at that point. Unlike a breakpoint, a program state definition is not tied to a specific line of code, variable, or function but, rather, has a scope of an entire program or a specified section of a program.

20 Claims, 7 Drawing Sheets

(56) References Cited

OTHER PUBLICATIONS

Zhao, et al., "How to do a million watchpoints: Efficient Debugging using Dynamic Instrumentation", Proceeding CC'08/ETAPS'08 Proceedings of the Joint European Conferences on Theory and Practice of Software 17th international conference on Compiler construction pp. 147-162, 2008, 147-162.

\* cited by examiner

```
1  int main(){
2  int weight = 0;
3  string name;
4  double height = 0;
5  double BMI = 0;
6  weight = 75;
7  height = 1.9;
8  name = "Bobby";
9  BMI = calculateBMI(weight, height);
10 printf("%s, your BMI is %d\n", &name, &BMI);
11 return 0; }
12
13 int calculateBMI(int x, double y){
14 float tempBMI = 0;
15 tempBMI = x/y^2;
16 return tempBMI; }
```

400

| Variable Type | Target Value |
|---|---|
| double | 20.77 |
| string | Bobby |

405

(A) 401

| TYPE | IDENTIFIER | VALUE | CHANGE | MATCH |
|---|---|---|---|---|
| int | weight | 0 | 1 | 0 |
| string | name | NULL | 1 | 0 |
| double | height | 0 | 1 | 0 |
| double | BMI | 0 | 1 | 0 |

(B) 402

| TYPE | IDENTIFIER | VALUE | CHANGE | MATCH |
|---|---|---|---|---|
| int | weight | 75 | 1 | 0 |
| string | name | Bobby | 1 | 1 |
| double | height | 1.9 | 1 | 0 |
| double | BMI | 0 | 0 | 0 |

(C) 403

| TYPE | IDENTIFIER | VALUE | CHANGE | MATCH |
|---|---|---|---|---|
| int | x | 75 | 1 | 0 |
| double | y | 1.9 | 1 | 0 |
| double | tempBMI | 20.77 | 1 | 1 |

(D) 404

| TYPE | IDENTIFIER | VALUE | CHANGE | MATCH |
|---|---|---|---|---|
| int | weight | 75 | 0 | 0 |
| string | name | Bobby | 0 | 1 |
| double | height | 1.9 | 0 | 0 |
| double | BMI | 20.77 | 1 | 1 |

DEBUGGING USING PROGRAM STATE DEFINITIONS

BACKGROUND

The disclosure generally relates to the field of computer systems, and more particularly to debugging of a software program.

Breakpoints are used during debugging to halt execution of a program and allow a programmer to examine the state of the program at the location of the breakpoint. Breakpoints may be assigned to a particular line of code, function, or variable. There are multiple types of breakpoints that provide different functionality. For example, a traditional breakpoint halts execution of a program each time the assigned location is reached. A conditional breakpoint is also assigned to a location but halts the program at that location if a specified condition for the location is satisfied. A watchpoint is a type of breakpoint that is assigned to a specific variable. A watchpoint halts execution of a program each time the value of the assigned variable changes. Some debuggers include other types of breakpoints such as a symbolic breakpoint or a data breakpoint. To use each of the breakpoint types, a programmer has some level of familiarity with a program. For example, a programmer knows the location of a problematic function within a program's code to assign a breakpoint to the function or knows the name and location of a problematic variable in order to assign a watchpoint to the variable.

SUMMARY

A program state definition comprises target values that correspond to problematic or unexpected output of a program. A debugger compares the target values of the program state definition to variable values of a program and stops execution of a program at a point where all target values are contained in variables of the program. By stopping execution of a program, the debugger allows a programmer to analyze the program at that point. Unlike a breakpoint, a program state definition is not tied to a specific line of code, variable, or function but, rather, has a scope of an entire program or a specified section of a program.

This summary is a brief summary for the disclosure, and not a comprehensive summary. The purpose of this brief summary is to provide a compact explanation as a preview to the disclosure. This brief summary does not capture the entire disclosure or all embodiments, and should not be used to limit claim scope.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to executing lines of code, suggesting lines of human-readable code (e.g., source code). Embodiments, however, can execute or interpret different units of a program and at different levels. Embodiments can execute or interpret blocks of code as defined by an intermediate level of code (e.g., intermediate code), byte codes, etc. In other instances, well-known instruction instances, protocols, structures and techniques have not been shown in detail in order not to obfuscate the description.

Overview

When debugging an unfamiliar program, a programmer may not know variable names or the general layout or function of a program's code. Because of this unfamiliarity, the programmer may be unable to identify locations in the code to insert breakpoints to aid in the debugging process. However, problematic or unexpected variable values may be known or can be determined by analyzing the output of a program. By defining a program state, a programmer can cause a debugger to stop execution of a program at a point where program variables contain the problematic values. A program state definition comprises target values. A debugger compares the target values of the program state definition to variable values of a program and stops execution of a program at a point where all target values are contained in variables of the program. For example, a program state definition may include target values "Bob" and 10 of data types string and int, respectively. The debugger will stop execution of a program at a location where a variable of type string with the value "Bob" and a variable of type int with the value 10 are both present in the program. By stopping execution of a program, the debugger allows a programmer to analyze the program at that point. Unlike a breakpoint, a program state definition is not tied to a specific line of code, variable, or function but, rather, has a scope of an entire program or a specified section of a program.

Example Illustrations

Figure 1:
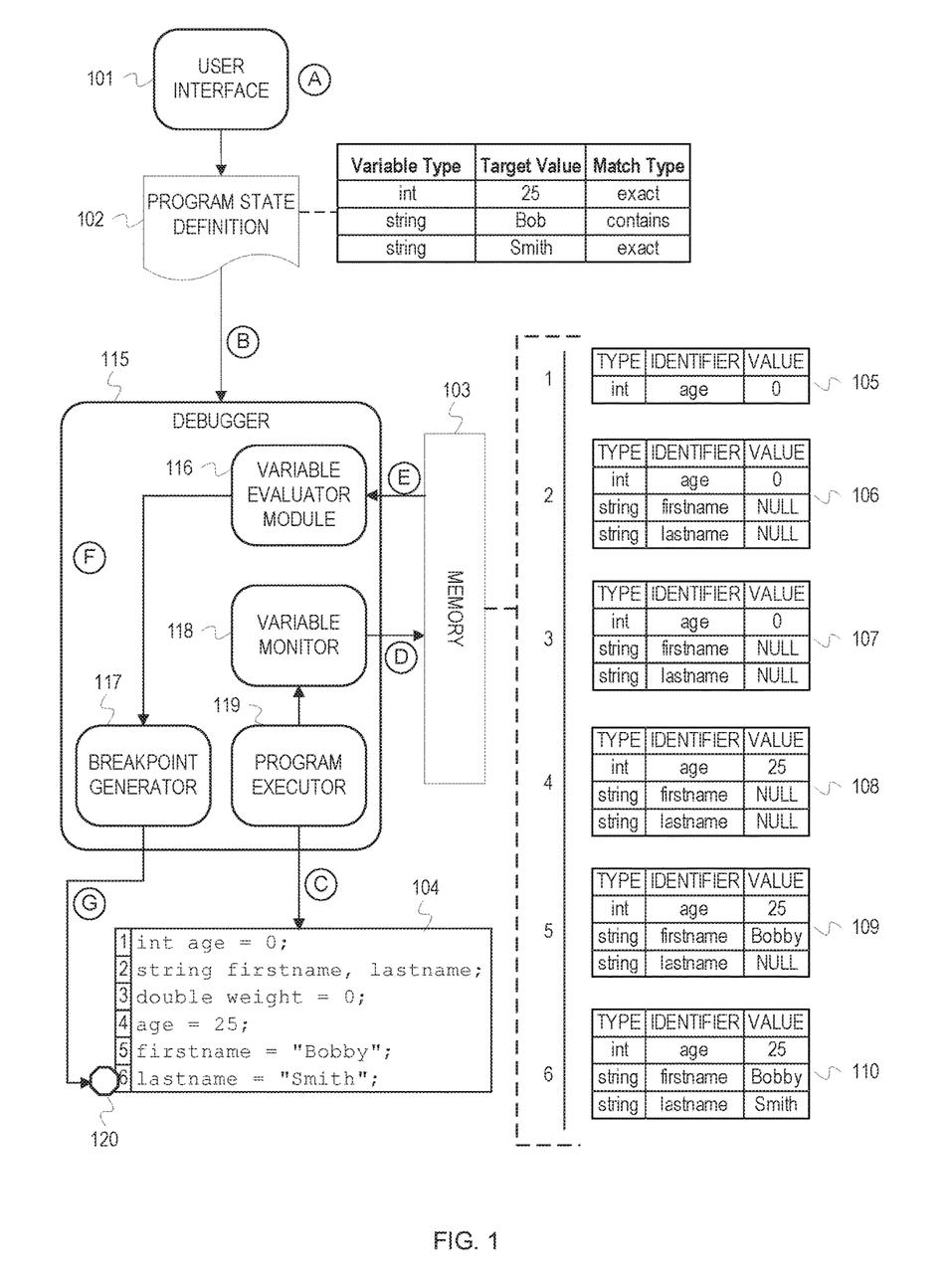
FIG. 1 is a conceptual diagram depicting an example system for using a program state definition to halt running of a program.
Figure 4:
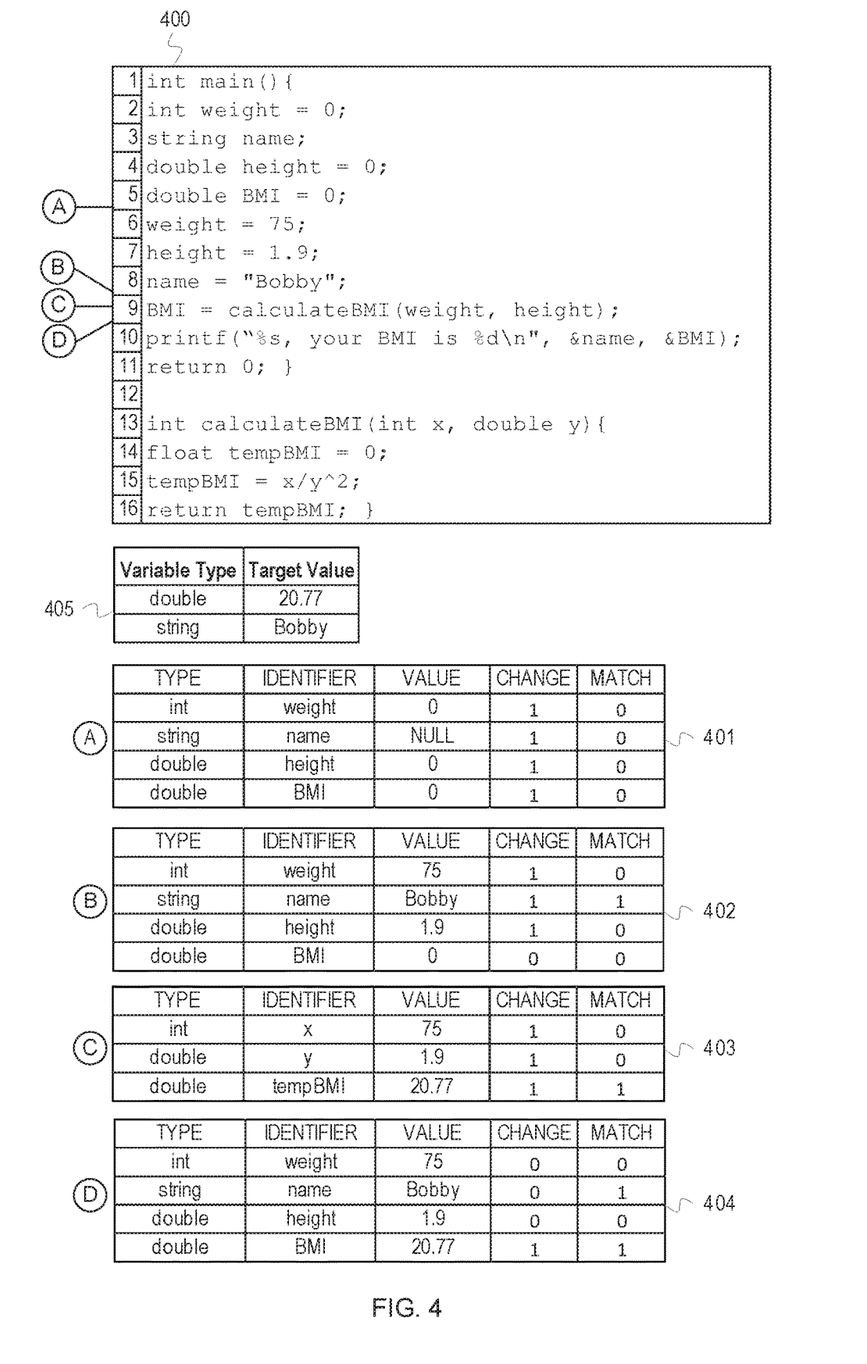
FIG. 4 illustrates variable tables with change and match bits at different states and scopes of a running program.

FIGS. 1 and 4 are annotated with a series of letters. FIG. 1 is annotated with the letters A-G, and FIG. 4 is annotated with the letters A-D. These letters represent stages of operations. Although these stages are ordered for these examples, the order is provided to aid in understanding this disclosure and should not be used to limit the claims. Subject matter falling within the scope of the claims can vary with respect to the order and some of the operations.

FIG. 1 is a conceptual diagram depicting an example system for using a program state definition to halt running of a program. FIG. 1 depicts a system that includes a user interface 101, program state definition 102, memory 103, program code 104, and debugger 115. The memory 103 includes a variable table as depicted by the variable table states 105-110. The debugger 115 includes a variable evaluator module 116, a breakpoint generator 117, a variable monitor 118, and a program executor 119. The breakpoint generator 117 outputs breakpoint 120.

At stage A, the program state definition 102 ("definition 102") is input using the user interface 101. Although depicted as separate in FIG. 1, the user interface 101 may be incorporated into the debugger 115. A program state definition comprises target values and corresponding data types. For example, the definition 102 contains the target values of 25, "Bob," and "Smith" with the corresponding data types of int, string, and string, respectively. In some implementations, a user may provide target values without providing an associated data type. In such implementations, a module of the user interface 101 or the debugger 115 may determine the corresponding data types based on the target values. For example, the debugger 115 may determine that the target value "Bob" is of a string data type. In addition to a data type, a match type may be associated with each target value. A match type indicates a kind of comparison or level of precision with which a variable value matches a target value to be considered a match. For example, match types may include "exact," "similar," or "contains." For example, as depicted in the definition 102, the target value of "25" has a match type of "exact," meaning that a debugger will consider an integer that has an exact value of 25 as matching. The target value of "Bob" has a match type of "contains," meaning that a debugger will consider any string that contains "Bob," such as "Bobby," to be matching. A match type of similar indicates that a match occurs on misspellings and very close iterations to the target value.

At stage B, the debugger 115 receives the definition 102 and uses the definition 102 to configure the variable monitor 118 and the variable evaluator module 116. The debugger 115 determines which data types are specified in the definition 102 and uses those data types to configure the variable monitor 118. The debugger 115 configures the variable monitor 118 to monitor variables of the specified data types. The debugger 115 also determines the target values and match types, if any, and indicates the data types, target values, and match types to the variable evaluator module 116. The variable evaluator module 116 uses the definition 102, as described at stage E, to determine if target values match the values of variables of the code 104.

At stage C, the program executor 119 begins running the code 104. The program executor 119 runs the code 104, such as compiling and executing the code 104, interpreting the code 104, etc. The program executor 119 may also run the code using an instruction set simulator. As the program executor 119 runs the code 104, the program executor 119 passes information regarding variable activity in the executed code 104 to the variable monitor 118. Variable activity includes the initialization of a variable or a change to a variable's value. For example, after executing line 1 of code 104, i.e. "int age=0", the program executor 119 would indicate to the variable monitor 118 that a variable of type int, named "age," was initialized to a value of 0. In some implementations, the program executor 119 sends the memory address of the initialized variable and the variable monitor 118 determines the value of the variable from the memory location. The program executor 119 may run the code 104 line by line, in different sized line increments, one function at a time, or for specified time intervals. For example, the program executor 119 may run the code 104 five lines at a time and indicate any variable activity to the variable monitor 118 after executing each five-line section. Additionally, the program executor 119 may run the code 104 until variable activity is detected and then pause to indicate the variable activity to the variable monitor 118.

At stage D, the variable monitor 118 ("monitor 118") writes variables received from the program executor 119 to a variable table in memory 103. Memory 103 may be dynamic random access memory, a cache, a hard disk, etc. The memory 103 hosts each of the variable table states 105-110 at different times. Each of the variable table states 105-110 in this illustration corresponds to a state in which a line of code has been executed. Variable table state 105 corresponds to a state after which line 1 of the code 104 has been executed, and variable table state 106 corresponds to a state after which lines 1 and 2 have been executed, and so on. The variable table states 105-110 contain three fields: type, identifier, and value. In some implementations, the variable table states 105-110 contain more or fewer fields. For example, the variable table states 105-110 may contain additional fields for a change and match bit as depicted in FIG. 4.

As the program executor 119 passes variables to the variable monitor 118, the monitor 118 determines if the variable should be added or updated in the variable table in the memory 103. For example, after line 1 of the code 104 is executed, the monitor 118 determined that the variable "int age" should be added to the variable table as depicted by variable table state 105. This determination is based on whether the variable is of a data type specified in the definition 102. Since the data type integer, i.e. int, is specified in the definition 102, the monitor 118 added the variable "int age" to the table. Similarly, after line 2 of the code 104 is executed, the monitor 118 added the two string variables "firstname" and "lastname" to the variable table as depicted by variable table state 106 since the data type string is specified in the definition 102. After line 3 of the code 104 is executed, the monitor 118 determined that the variable "double weight" should not be added to the variable table as depicted by the variable table state 107 since the data type double is not specified in the definition 102. The monitor 118 could add the variable "weight" to the variable table since the data type double is similar to the integer data type if the debugger is configured to also monitor similar data types as those specified or a user specifies expanded monitoring to include data types similar to those specified. After line 4 of the code 104 is executed, the monitor 118 determines that the value of the integer "age" changed and, as a result, updates the value in the variable table as depicted by the variable table state 108. Similarly, after lines 5 and 6 of the code 104 are executed, the monitor 118 updates the values for the strings "firstname" and "lastname" as depicted by the variable table states 109 and 110, respectively.

At stage E, the variable evaluator module 116 ("evaluator 116") reads the variable table from the memory 103 and compares the variable values to the target values of the definition 102. The operations of stage E occur each time the monitor 118 adds or updates a variable in the variable table. For example, after the monitor 118 adds the integer variable "age" and its value 0 to the variable table state 105, the evaluator 116 reads the variable table as depicted by the variable table state 105. The evaluator 116 then compares the values in the variable table to the target values contained in the definition 102. The evaluator 116 compares values in the variable table to target values of the same or similar data type. For example, the evaluator 116 compares the value 0 of the integer "age" in the variable table state 105 to the integer target value 25.

At stage F, the evaluator 116 indicates to the breakpoint generator 117 that the definition 102 has been satisfied. The definition 102 is satisfied once each of the target values matches a value in the variable table stored in the memory 103. In the illustration of FIG. 1, the variable table state 110, which depicts the variable table at a state where lines 1-6 of the code 104 have been executed, contains an integer "age" with a value of 25, a string "firstname" with a value of "Bobby," and a string "lastname" with a value of "Smith." The variable values are compared to the target values by the evaluator 116 according to their match type. As a result of the comparison, the evaluator 116 determines that each of the target values matches a value in the variable table 110 indicating that the definition 102 has been satisfied. In other words, the value 25 of the integer "age" is an exact match for the target value 25, the value "Bobby" of the string "firstname" contains the target value "Bob," and value "Smith" of the string "lastname" is an exact match for the target value "Smith." Because all of the target values are present in the variable table, the evaluator 116 indicates to the breakpoint generator 117 that the definition 102 has been satisfied.

At stage G, the breakpoint generator 117 generates and inserts a breakpoint in the code 104 in response to the indication from the evaluator 116 that the definition 102 has been satisfied. In the illustration of FIG. 1, the definition 102 is satisfied after execution of line 6 of the code 104. As a result, the breakpoint 120 is generated by the breakpoint generator 117 and inserted at line 6 of the code 104. The breakpoint generator 117 may also halt execution of the code 104 to allow for a programmer to analyze the state of the code 104 at the breakpoint. In implementations where multiple program state definitions are received, the code 104 may continue to run until a breakpoint for each program state definition has been inserted.

In some implementations, data types for the target values are not provided with the definition 102 and are not determined by a module of the user interface 101 or the debugger 115. In such implementations, the debugger 115 configures the monitor 118 to monitor for all variables regardless of their data type. As a result, the variable table states 105-110 may not include a field to store a variable's data type. Additionally, the evaluator 116 will compare all values in the variable table to each target value in the definition 102 regardless of their data type, as the data types for the target values are unknown. For example, after reading the variable table state 105, the evaluator 116 compares the value 0 of the variable "age" to the target value 25 and the target values "Bob" and "Smith." Although this may increase the time to find a match, this implementation allows a breakpoint to be established without knowing data types for the set of target values or program variables.

For ease of explanation, only six lines of the code 104 are depicted in FIG. 1. In actuality, program code being debugged, such as the code 104, may comprise thousands or millions lines of code. Such programs may include hundreds of variables which may also increase the size of the variable table maintained by the variable monitor 118.

Figure 2:
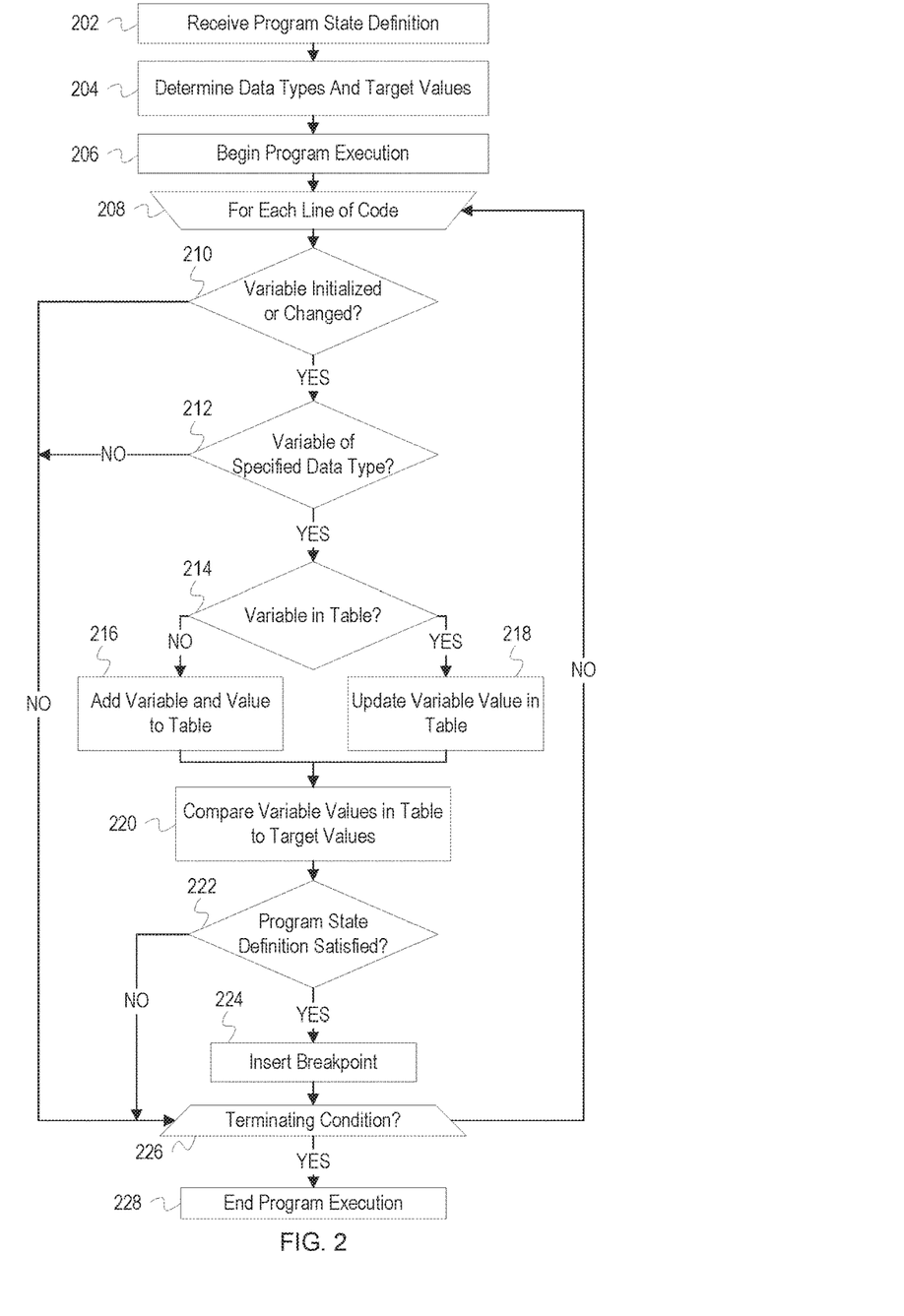
FIG. 2 depicts a flow diagram illustrating example operations for using a program state definition during the debugging of a program.

FIG. 2 depicts a flow diagram illustrating example operations for using a program state definition during the debugging of a program. The following flows will be described with reference to a debugger. However, a program that is referred to as a debugger is not necessary. The example operations can be performed by an add-on, plug-in, integrated development environment ("IDE"), or program code identified with some other moniker. The naming used in these examples should not be used to limit scope of any claims based on this description since naming can vary by platform, developer, programming language, etc.

A debugger receives a program state definition (202). For example a user inputs the program state definition using a user interface (e.g., a front-end of a debugger). Additionally, a user may define a program state definition using a command line or other manual entry method. Furthermore, a user may supply a file that contains definitions for one or more program states.

The debugger determines data types and target values (204). Data types and target values are determined from the program state definition and used to configure a debugger. The debugger is configured to monitor for variables that are of the same or similar data types specified in the program state definition. For example, if the program state definition specifies an integer data type, integer variables in a program will be monitored by the debugger. The debugger may also monitor data types that are similar to an integer such as a double or float, as these data types may also contain an integer target value. In some implementations, a user does not enter data types in the program state definition. In such an implementation, the debugger may determine a data type based on the target value or may monitor all variables in a program regardless of data type.

A program begins execution (206). A program may be interpreted, executed, compiled and executed, etc. The code for a program can be accessible so that a programmer may view and make changes to the code via the debugging environment/application. However, a program may sometimes be compiled and the program's code inaccessible. Even in compiled form, a program may be executed incrementally using a debugger, and a breakpoint inserted to halt program execution and allow for analysis of the program's state using various debugging tools.

A loop in which each line of code is executed begins (208). Specific lines or sections of code may be excluded from the loop operations. For example, if known to a programmer, a unit of the program (e.g., a function, method, procedure, etc.) unrelated to an issue being debugged may be excluded from loop operations. Additionally, loop operations may be performed on a particular section or lines of code. In such cases, a program may execute until a specified section is encountered and then may step through the lines of the section so the loop operations may be performed. For example, a programmer may specify lines 11-20 of a program. When executing the program, the debugger will execute lines 1-10 without performing the loop operations described below. Once line 11 is reached, the debugger will begin executing the code a line at a time so the loop operations may be performed after each line execution.

The debugger determines whether a variable was initialized or changed (210). The effects of the previously executed line of code are analyzed to determine if the line of code caused a variable to be initialized or caused the value of a variable to change. The debugger may determine whether a variable was initialized or changed based on the contents of a symbol table, whether any load or store instructions were executed, etc. If a variable has not changed or has not been initialized, the debugger determines whether the terminating condition for the loop for each line of code has been satisfied (226).

If a variable has changed or been initialized, the debugger determines whether the variable is of a type specified in the program state definition (212). If the variable is not of a type specified in the program state definition, it is determined whether the terminating condition for the loop for each line of code has been satisfied (226).

If the variable is of a type specified in the program state definition, the debugger determines whether the variable is in a variable table (214). The variable table is a table that is used by the debugger to maintain and monitor the values of a running program's variables. A variable table may be any type of data structure capable of storing a value, a type, and an identifier for a variable. For example, a variable table may be a hash table or a two dimensional array.

If the variable is not in the variable table, the debugger adds the variable and its value to the variable table (216). A variable may be added by adding the variables data type, unique identifier, and value. If the variable is in the variable table, then the value of the variable is updated in the variable table (218). The value of the variable is updated by locating the entry for the variable in the table using the variable's identifier and then changing the value for the table entry to the updated value.

The debugger compares the values in the variable table to the target values of the program state definition (220). The debugger may compare the table's values to the target values using a variety of techniques. For example, the debugger may compare the values using the example operations described in FIG. 3. Additionally, a debugger may search the table using a target value to determine if the table contains the value. Whether a variable's value is considered a match for a target value may depend on the match type associated with a target value. As described in FIG. 1, a match type can indicate that a value similar to or containing the target value may be considered a match. Other match types are possible. For example, for a string target value of "$," the match type may specify that any string that begins with "$" is considered a match. Additionally, for numeric data types, the match types may specify that a number is considered a match if the number is greater than or less than a target value or within a specified tolerance of a target value.

The debugger determines whether the program state definition is satisfied (222). The program state definition is satisfied if a match was found in the table for each target value. For example, a program state definition may specify five target values. If the debugger found a match for all five target values in the variable table, then the program state definition is satisfied. If the program state definition is not satisfied, then the debugger determines whether the terminating condition for the loop for each line of code has been satisfied (226).

If the program state definition is satisfied, the debugger inserts a breakpoint into the program (224). A breakpoint is inserted into the program at the current point of execution. A breakpoint may be inserted using the technique or method established by the debugger or IDE. Alternatively, instead of inserting a breakpoint, the debugger may halt execution of a program. In instances where a program's code is inaccessible, a debugger may be unable to insert a breakpoint at a specific line of code. Instead, a debugger may send an instruction or modify a program instruction to cause a processor to halt execution of the program at its current state. For example, in an x86 processor environment, the INT 3 instruction may be sent to the processor to call the debug exception handler and cause a breakpoint.

The debugger determines whether the terminating condition for the loop beginning at process block 208 is satisfied (226). As described above, the loop and the program may terminate once a breakpoint has been inserted. If there are multiple program state definitions, the loop may terminate once a breakpoint location has been found for each of the program state definitions. Additionally, the loop may terminate after the loop finishes iterating over a specified section of code. If the terminating condition has been satisfied, the program stops running (228).

Figure 3:
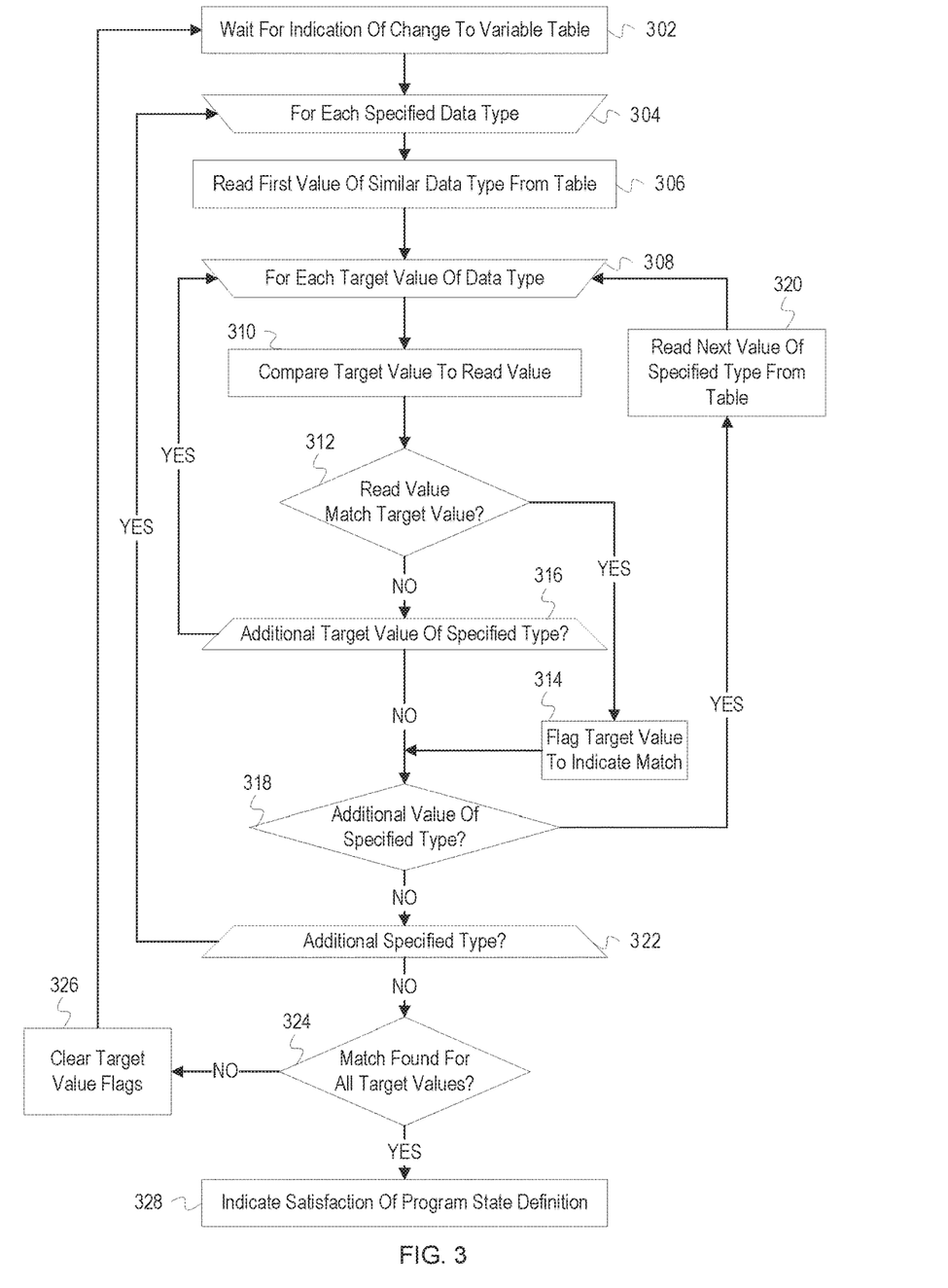
FIG. 3 depicts a flow diagram illustrating example operations for determining whether a program state definition is satisfied.

FIG. 3 depicts a flow diagram illustrating example operations for determining whether a program state definition is satisfied. FIG. 3 could be example operations for process blocks 220 and 222 of FIG. 2. The example operations below may be performed by a module of a debugger. For example, the example operations may be performed by a variable evaluator such as the variable evaluator 116 described in FIG. 1.

A variable evaluator waits for an indication of a change to a variable table (302). The variable evaluator is similar to the variable evaluator 116 described in FIG. 1 in that the variable evaluator performs operations to determine whether program state definition has been satisfied. The variable evaluator performs operations to determine whether program state definition is satisfied each time an indication of a change to the variable table is received. In some implementations, the variable evaluator performs operations if it receives an indication of a change to a specific data type. For example, if all string target values of a program state definition have been satisfied, then a variable evaluator performs operations if an indication of a change to an integer value is received. Additionally, in some implementations, a variable evaluator waits to perform operations once a threshold number of variables have been added to a variable table. For example, if the program state definition specifies five target values, the variable evaluator begins performing operations once five variables have been added to a variable table.

A loop for each specified data type begins (304). The loop selects each unique specified data type in a program state definition. For example, a program state definition may specify five variables: three strings, one double, and one integer. Even though there are five variables, the loop iterates three times for the three unique data types. On a first iteration, the loop may select the string data type. On a second iteration, the loop may select the double data type. And, on a third iteration, the loop may select the integer data type. Certain data types may be collected and treated as a single type within an iteration. For example, double and integer may be treated as a single unique data type. Additionally, if target values for a data type have already been matched to a variable value, the data type may not be iterated over.

The variable evaluator reads a first value of a similar data type from the variable table (306). The variable evaluator locates the first value in the variable table that is of the same or similar data type as the selected data type. The variable evaluator may read the data type of each entry in the variable table until a data type that is the same as the selected data type is encountered. Once the variable evaluator encounters a table entry with a similar data type, the variable value of the entry is read from the table.

A loop for each target value of the specified data type begins (308). The loop selects each target value in a program state definition that is of the selected data type. For example if the selected data type is string, a loop iterates through all target values of the data type string.

The variable evaluator compares the selected target value to the read value (310). The target value and the read value are compared according to a match type as described above in FIG. 2 at process block 220. If no match type is specified, the values may be compared according to a default match type for the selected data type. For example, an integer data type may have a default match type of "exact," and a string data type may have a default match type of "contains."

The variable evaluator determines whether the read value matches the target value (312). Whether the read value matches the target value depends on the results of the comparison and the match type for the target value. If the comparison performed at process block 310 indicated that the values are not a match, it is determined whether there is an additional target value of the specified data type (316). If all target values of the specified data type have not been compared to the read value, the variable evaluator selects the next target value of the specified data type (308).

If the comparison performed at process block 310 indicated that the values are a match, the loop for each target value of the specified data type terminates, and the variable evaluator flags the target value to indicate that a match has been found (314). A target value may be associated with a bit that contains a 1 to indicate a match has been found for a target value or a 0 to indicate that a match has not been found. The target value may be flagged by changing the bit value to a 1 to indicate that a match has been found. Additionally, a variable evaluator may track which target values have been matched using other techniques. For example, a variable evaluator may assign a unique identifier to each target value and write the unique identifier to a list of matched target values. In some implementations, the variable evaluator increments a counter that counts the number of target values that have been matched. In addition to flagging the target value, a bit in an entry of the variable table may be set to indicate that a match has been found for the variable at that entry. If the match bit is set, the variable evaluator no longer reads and compares the variable to other target values. The operation of a match bit in the variable table is described in more detail in FIGS. 4 and 5.

After flagging a target value or after all target values of the specified data type have been compared to the read value, the variable evaluator determines whether there is an additional value of the specified data type in the variable table (318). If there is an additional value of the specified data type in the variable table, the next value of the specified data type is read from the table (320).

After the next value of the specified data type is read from the table, the loop for each target value of the specified data type begins again (308). Upon subsequent iterations of the loop, target values that have been flagged may not be selected and compared against the read value, as matches for those target values have already been found.

If there is not an additional value of the specified data type in the variable table, the variable evaluator determines whether there is an additional specified data type in the program state definition (322). If there is an additional specified data type, the variable evaluator selects the next specified data type in the program state definition (304).

If there is not an additional specified data type, the variable evaluator determines whether a match was found for all target values (324). If all target values have been flagged, then a match was found for all target values. In implementations using a counter, if the counter is equal to the number of target values, then a match was found for all target values.

If the variable evaluator determines that a match has not been found for all target values, the variable evaluator clears the target value flags (326). The target value flags are cleared so that the target values are again compared to the variable table values. If the target value flags are not cleared, a flag may incorrectly indicate a match for a target value in the event that a matched value in the variable table changes. Once the target value flags are cleared, the variable evaluator waits for another indication of a change to a variable table (302).

If the variable evaluator determines that a match has been found for all target values, the variable evaluator indicates that the program state definition has been satisfied (328).

The indication may be sent to a breakpoint generator to generate and insert a breakpoint at the point in the program in which the program state definition was satisfied. Additionally, the indication may be used to record the point at which the program state definition was satisfied so that a programmer may review the code at this point.

Figure 5:
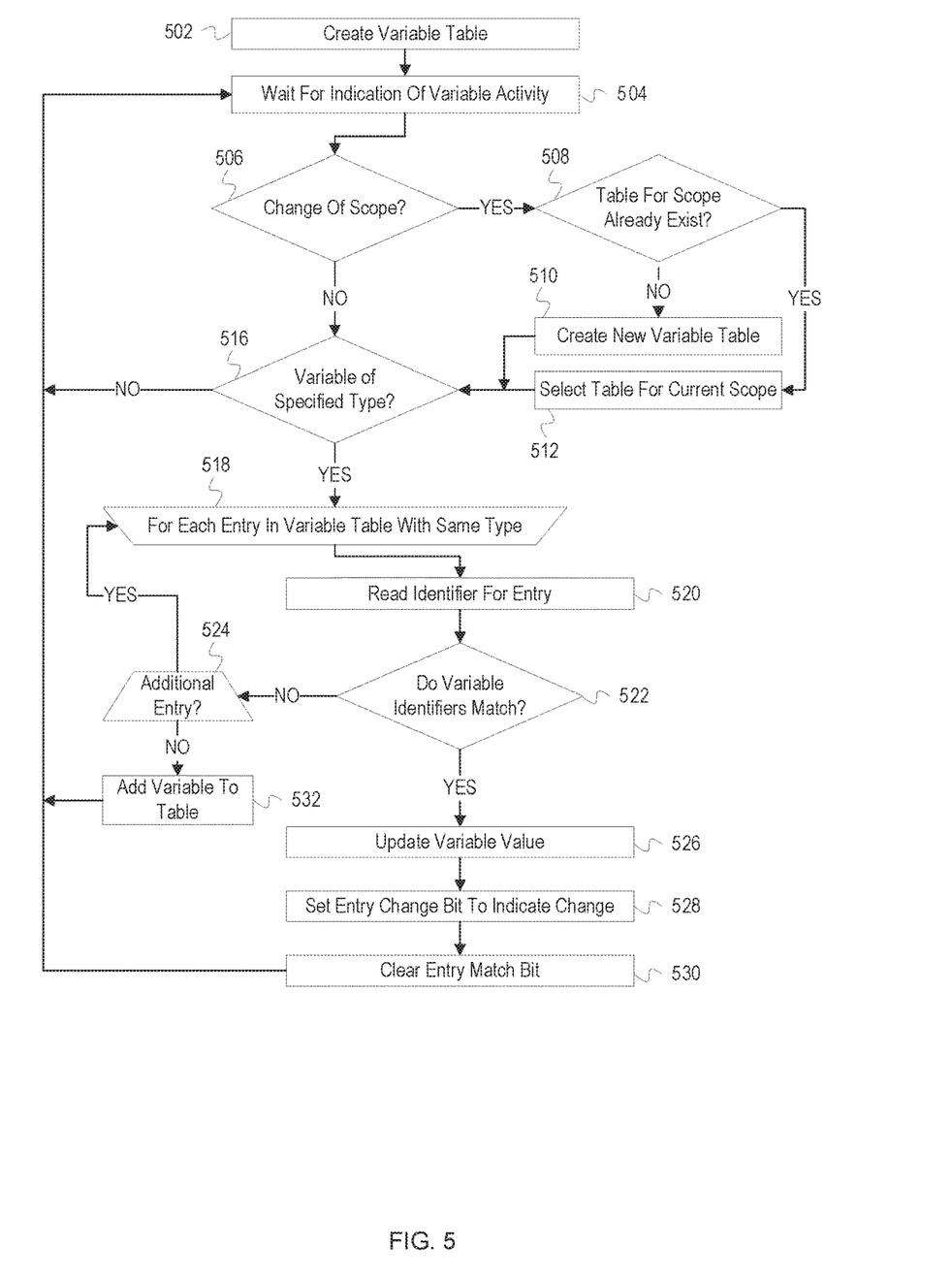
FIG. 5 depicts a flow diagram illustrating example operations for maintaining variable tables for changing program scopes.

Within a program, there are different scopes that affect which variables may be accessed. For example, variables defined within a function have a local scope, meaning they are accessible from within the function where they were defined. Some variables may have a global scope meaning they are accessible from anywhere within a program. A debugger, when maintaining a variable table, accounts for changing scopes and updates or creates a new variable table accordingly. FIG. 4 illustrates a variable table at different states throughout changing scopes of a program. FIG. 5 illustrates example operations for maintaining a variable table in a program with changing scopes.

Additionally, FIGS. 4 and 5 describe the use of a change bit and a match bit in entries of a variable table. A change bit indicates that the value of the entry in the variable table has been changed. A match bit indicates that a match between the variable value in the entry and a target value has been found.

FIG. 4 illustrates variable tables with change and match bits at different states and scopes of a running program. FIG. 4 depicts program code 400, variable table states 401-404, and program state definition 405.

Program code 400 ("code 400") includes stage markers A-D that correspond to stage markers A-D of the variable table states 401-404. The stage markers indicate the current state of execution of the program code 400. For example, at stage A, the first five lines of the code 400 have been executed. The variable table states 401-404 depict a variable table at the different states of execution of the code 400. The variable table state 401 corresponds to the stage A marker and depicts the contents of the variable table at the state of execution at stage A. The variable table 402 corresponds to the stage B marker and depicts the contents of the variable table at the state of execution at stage B, and so on. Although only four variable table states are depicted, additional table states are possible as the variable table may be updated or changed after each line of the code 400 is executed. However, in order to avoid obfuscating the description, only four states are depicted.

The program state definition 405 includes two target values. The first is a double data type with a target value of 20.77, and the second is a string data type with a target value of "Bobby." The program state definition 405 is satisfied once a double variable and a string variable contain the target values and are within the same scope.

In addition to the data type, identifier, and value fields, the variable table states 401-404 contain two additional fields, change and match. The change field contains a bit for an entry in the variable table to indicate whether that entry has been changed. The change bit is set to indicate a change to an entry each time an entry is created or the value of an entry changes. For example, the change bit may be set by changing the value to a 1. The change field may be used by a variable evaluator to determine whether to compare the entry's value to target values. After a variable evaluator compares an entry, the change bit is set back to a default state or to 0. The variable evaluator will not compare the entry to a target value until the change bit is again set to indicate a change to the entry. The match field contains a bit for an entry in the variable table to indicate whether that entry has been matched to a target value. Once a variable evaluator has matched an entry to a target value, the variable evaluator may set the match bit to a 1 to indicate that a match has been found. The variable evaluator will no longer compare entries that have been matched to target values. However, in the event that the value of a matched entry is changed, a variable monitor will set the match bit back to a default state or 0 to indicate that the entry may no longer be a match.

At stage A, four variables have been added to the variable table as depicted by variable table state 401. The four variables, weight, name, height, and BMI, were initialized in lines 1-5 of the code 400. The variable "name" is of the string data type and is added to the variable table because the program state criteria 405 specifies a target value of the string data type. Similarly, the variables height and BMI are of the double data type which is the same data type as a target value specified in the program state definition 405. The integer "weight" is added to the variable table if a debugger or variable monitor is configured to monitor for variables of similar data types. The data type integer is similar to the data type double in that they both hold numeric values and may contain the same value. For example, a double may contain the value 4.00 while an integer may also contain the value 4. Because the variables were added to the variable table as depicted by the variable table state 401, the change bit is set to a 1 for each entry.

Although not depicted, after each stage, a variable evaluator will compare the values in the variable tables to the target values of the program state definition 405. After the comparison, the change bit for each entry will be set back to a 0 by the variable evaluator. In this example, after comparing the values depicted in variable table state 401, all of the change bits will be set to a 0. Additionally, if a match was found, the variable evaluator will set the match bit to a 1 to indicate that the entry matched a target value.

At stage B, the variable table state 402 reflects the changes in value of the variables weight, name, and height that occurred in lines 6-8 of the code 400. The change bits for the weight, name, and height entries have been again set to a 1 to indicate a change to those entries. The change bit for the BMI variable entry remains a 0 as the value has not changed. The match bit of the "name" variable entry has been set to a 1 to indicate that a match has been found between the entry and a target value of the program state definition 405. In this instance, the target value "Bobby" is contained in the variable "name."

At stage C, the scope of the code 400 changes. Up until stage C, the running code has been contained within the function main( ). At stage C, line 9 of the code 400 calls the function calculateBMI( ). Once program execution enters the function calculateBMI( ), all variables initialized within the function main( ) are out of scope. In this instance, the variables weight, name, height, and BMI are out of scope. As a result, a new variable table is created to maintain variables contained within the new scope. The variable table state 403 reflects the variables and associated values contained within the new scope of the function calculateBMI( ). The variables x and y are initialized to the values of weight and height which are passed to the calculateBMI( ) function, and the variable tempBMI is initialized and set to a value of 20.77. Since the variables were added to the variable table state 403, the change bit for the variable entries is set to a 1. Additionally, a variable evaluator has found a match for the tempBMI variable, so the match bit for that entry is set to a 1. The program state definition 405 contains two target values, 20.77 and "Bobby." At stage B, a match was found for "Bobby," and now at stage C, a match has been found for 20.77. However, since the matched variables are not within the same scope the program state definition 405 is not satisfied, a breakpoint will not be generated, and program execution continues.

At stage D, the call to the function calculateBMI( ) has resolved and scope has returned to the function main( ) of the code 400. Because the function call has resolved, the value of the variable BMI is set to the value 20.77. As a result, both of the target values are now contained in variables of the same scope. As indicated by the match bits, a match has been found for both the double and string target values of the program state criteria 405. Since the program state definition 405 has been satisfied, a breakpoint will be generated and inserted at line 9 of the code 400.

FIG. 5 depicts a flow diagram illustrating example operations for maintaining variable tables for changing program scopes. FIG. 5 could be example operations for process blocks 210-218 of FIG. 2. The example operations below may be performed by a module of a debugger. For example, the example operations may be performed by a variable monitor such as the variable monitor 118 described in FIG. 1.

A variable table is created (502). A variable table may be created by allocating space in memory or initializing a data structure to contain table entries.

A variable monitor waits for an indication of variable activity (504). Variable activity includes an initialization of a variable or a change in value of a variable. Additionally, an indication also includes whether there has been a change in scope. Variable activity may also indicate that a variable has been converted to a different data type. For example, a variable of an integer data type may be converted to a string data type using a toString( ) function and vice versa using a toInt( ) function.

The variable monitor determines whether there has been a change in scope (506). If there has been a change in scope, the variable monitor determines whether a table for the current scope already exists (508). If a table already exists, the variable monitor selects the existing table for the current scope (512). If a table does not already exist, the variable monitor creates a new variable table for the current scope (510). If a new table is created, the variable monitor will populate the table with any variables that have a global scope. As described above, variables with a global scope are accessible from within any scope of a program and, thus, will be present in a variable table for all scopes.

After the variable monitor determined there was not a change in scope or after the variable monitor selected or created a table for the current scope, the variable monitor determines whether the variable associated with the indication of variable activity is of a type specified by a program state definition (516). In some instances, the indication of variable activity may be associated with more than one variable. In such instances, the variable monitor determines whether any of the variables are of a type specified by the program state definition. Additionally, if the variable activity indicates that a variable has been converted to a different data type, the variable monitor determines whether the converted data type is of a type specified by the program state definition. If no variables are of a specified data type, the variable monitor waits for another indication of variable activity (504).

If a variable is of the specified data type, a loop begins for each entry in the variable table of the same or similar data type as the variable associated with the indication of variable activity (518). For example, if the variable is a string, the loop iterates over each entry in the variable table that is of the data type string. If multiple variables are associated with the indication of variable activity, the loop repeats for each variable.

The variable monitor reads an identifier for the entry in the variable table (520). After the identifier for the entry is read, the variable monitor determines whether the identifier matches the identifier of the variable associated with the indication of variable activity (522). If the identifiers do not match, the variable monitor determines whether there is an additional entry of the same data type in the variable table (524). If there is an additional entry, the variable monitor selects the next entry (518). If there is not an additional entry, the variable monitor adds the variable to the variable table (532). The variable is added to the table because no entry with a matching identifier was found, which indicates that there was not an existing entry for the variable. In instances where a variable was converted to a different data type, a new entry will be added that includes the converted data type, an identifier, and the value of the variable in the converted format. Because a new variable was added, the change bit for the entry of the added variable is set to a 1.

If the identifier for the variable does match an identifier for a table entry, the variable monitor updates the value in the entry with the value of the variable associated with the indication of variable activity (526).

After the value is updated, the variable monitor sets the change bit for the table entry to indicate a change to the entry (528). As described in FIG. 4, the change bit may be set to a 1 to indicate that the value of the table entry has changed.

After the change bit is set, the variable monitor clears the match bit for the entry (530). If the match bit was set to indicate a match had been found for the entry, the match bit is cleared or set to a default or 0 value to indicate that there is not a match for the entry. By clearing the match bit, the variable monitor indicates to a variable evaluator that the value for the entry may again be compared to target values to find a match.

After the match bit is cleared, the variable monitor waits for another indication of variable activity (504).

In the flow diagrams of FIGS. 2, 3, and 5, a debugger performs various operations to monitor and compare values of a program to a set of target values. In order to perform these operations, the debugger may instrument source code of the program or may instrument a compiled program's binary, i.e. source instrumentation or binary instrumentation. Instrumentation causes interruptions of the program execution. In other words, the program that is compiled/executed is different than the actual source code or binary program so that additional operations may be performed. For example, the debugger may instrument a program at each point where a variable is initialized to determine if the variable is of a specified data type. Additionally, the debugger may instrument the program to store variable values in a variable table and compare the variable values to the set of target values. The debugger can determine locations to instrument the program using a program database file ("PDB") or other file used for storing debugging information that includes variable data types, symbols or identifiers, and locations. When performing binary instrumentation, the debugger may utilize an interpreter or other module to analyze and instrument the program during execution. Additionally, the debugger can determine locations to instrument the program by performing pre-processing on the code as described in FIG. 6.

Figure 6:
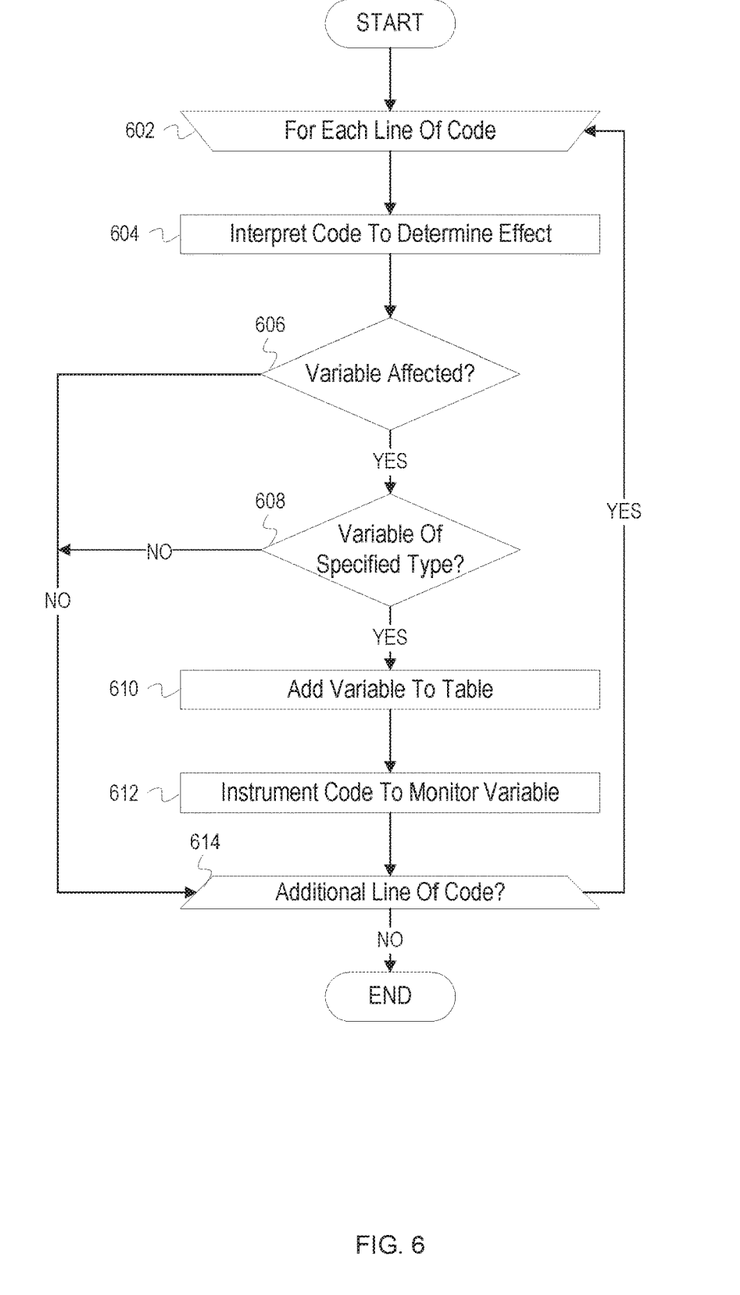
FIG. 6 depicts a flow diagram illustrating example operations for performing pre-processing and instrumenting a program's code to monitor variable values.

FIG. 6 depicts a flow diagram illustrating example operations for performing pre-processing and instrumenting a program's code to monitor variable values. The following example operations do not execute lines of code but, rather, interpret the lines of code to determine locations where variables of a specified data type are affected. A debugger then instruments the code at those locations as described above to monitor the variable values.

A loop for each line of code in a program begins (602). Specific lines, sections of code, or a unit of the program (e.g., a function, method, procedure, bytecode, etc.) may be excluded from the loop operations. Additionally, loop operations may be performed on a particular section or lines of code. In such implementations, a program may execute until a specified section is encountered and then execute the lines of the section line by line so the loop operations may be performed.

A debugger interprets a line of code to determine its effect (604). The line of code is interpreted to determine a potential effect or result of executing the line of code. For example, the effect of executing a line of code may be that a variable of a certain data type is initialized.

The debugger determines whether a variable is affected (606). The effect of the line of code is analyzed to determine if executing the line of code would cause a variable to be initialized or change value. If the line of code would not cause a variable to be initialized or change value, the debugger determines whether there is an additional line of code (614).

If the line of code would cause a variable to be initialized or change value, the debugger determines whether the variable is of a type specified in a program state definition (608). If the variable is not of a specified data type, the debugger determines whether there is an additional line of code (614).

If the variable is of a specified data type, the debugger adds the variable to a variable table (610). The variable is added to the variable table by adding an entry that contains the variable's data type and identifier. If the value of a variable can be interpreted from the code, the variable's value may also be added. After interpreting all lines of code for a program, the variable table will contain all variables in the code that are of the data types specified in the program state definition.

Once the variable is added to the table, the debugger instruments the code to monitor the variable (612). As described above, a debugger may instrument code to perform additional operations such as compare or monitor variable values. In this instance, the debugger instruments the code to write the variable's value at the instrumented location to the entry for the variable in the variable table.

After the debugger has instrumented the code, the debugger determines whether there is an additional line of code (614). If there is an additional line of code, the debugger selects the next line of code in the program (602). If there is not an additional line of code, the process ends.

Variations

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, it may be determined whether a variable is of a specified data type (block 516 of FIG. 5) before it is determined whether there has been a change in scope (block 506 of FIG. 5). As another example, the execution of a program may end (block 228 of FIG. 2) immediately after a breakpoint is inserted (block 224 of FIG. 2). It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

The example operations above may be altered or performed in different orders to allow for breakpoint locations to be identified for multiple program state definitions. For example, the operations of FIG. 3 may be repeated to accommodate all data types and target values specified in the multiple program state definitions.

Some operations above iterate through sets of items, such as lines of code and data types. In some implementations, data types may be iterated over in different orders. Also, the number of iterations for loop operations may vary. A loop may not iterate for each line of code (block 208 of FIG. 2). A loop may terminate early after a breakpoint has been inserted (block 224 of FIG. 2). Additionally, specific lines or sections of code may be excluded from the loop operations. For example, if known to a debugger, a section of code that contains a function unrelated to the issue being debugged may be excluded from the loop.

During the pre-processing of code as described in FIG. 6, it may be determined that certain program scopes or functions do not contain enough variables or enough variables of the specified data types to satisfy the program state definition. For example, a function may only contain a single string variable within its scope. If the program state definition specifies two string data type target values, the function cannot satisfy the program state definition, and thus, the function and its variables may be excluded from operations that monitor variables and determine whether a program state definition has been satisfied.

As described above, the program state definition is satisfied, when all variables that indicate the target values are within the same scope. However, in some implementations, a programmer may wish to disregard program scope and, instead, insert a breakpoint at a point in which a set of target values have all been encountered throughout a program's execution. For example, a program state definition may include target values of 1, 2, and 3. A variable evaluator may determine that a variable with the value 1 and a variable with a value 2 have been encountered. Upon encountering a variable with the value 3, the evaluator will indicate that the program state definition has been satisfied regardless of whether the variables that contained the target values 1 and 2 are still in scope.

Additionally, in some implementations, a program state definition may be considered satisfied without a match for all target values. For example, a user may specify that only two out of three target values need to be matched before generating a breakpoint. Furthermore, other conditions may specified, such as a sequence in which target values should be encountered or a number of lines of code a variable's value should remain consistent before generating a breakpoint.

The variations described above do not encompass all possible variations, implementations, or embodiments of the present disclosure. Other variations, modifications, additions, and improvements are possible.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium. A machine-readable storage medium does not include signals.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 7:
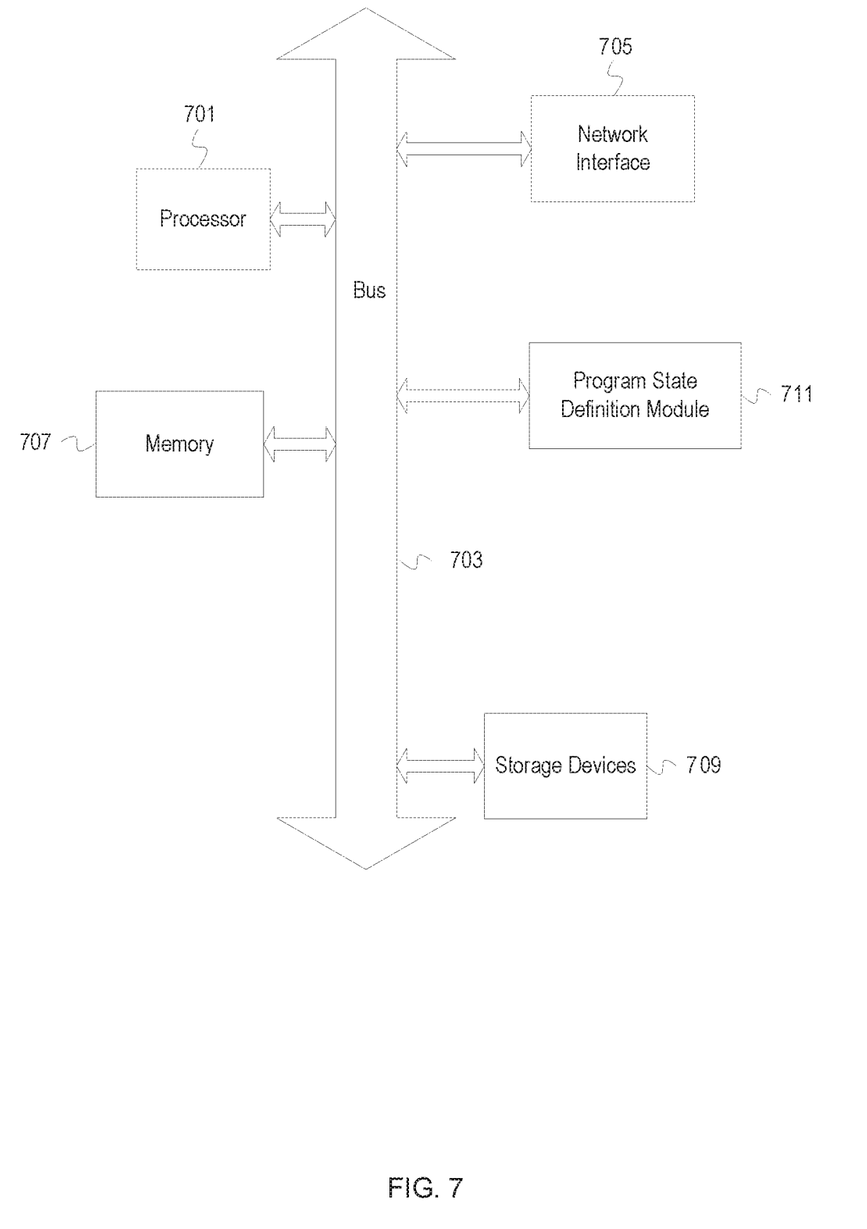
FIG. 7 depicts an example computer system with a program state definition module.

FIG. 7 depicts an example computer system with a program state definition module. The computer system includes a processor unit 701 (possibly including multiple processors, multiple cores, multiple nodes, and/or implementing multi-threading, etc.). The computer system includes memory 707. The memory 707 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 703 (e.g., PCI, ISA, PCI-Express, HyperTransport® bus, InfiniBand® bus, NuBus, etc.) and a network interface 705 (e.g., a Fiber Channel interface, an Ethernet interface, an internet small computer system interface, SONET interface, wireless interface, etc.). The system also includes a program state definition module 711. The program state definition module 711 evaluates a program state definition to determine locations in a program to insert breakpoints during debugging. Any one of the previously described functionalities may be partially (or entirely) implemented in hardware and/or on the processing unit 701. For example, the functionality may be implemented with an application specific integrated circuit, in logic implemented in the processing unit 701, in a co-processor on a peripheral device or card, etc. Further, realizations may include fewer or additional components not illustrated in FIG. 7 (e.g., video cards, audio cards, additional network interfaces, peripheral devices, etc.). The processor unit 701 and the network interface 705 are coupled to the bus 703. Although illustrated as being coupled to the bus 703, the memory 707 may be coupled to the processor unit 701.

While the aspects of the disclosure are described with reference to various implementations and exploitations, it will be understood that these aspects are illustrative and that the scope of the claims is not limited to them. In general, techniques for using program state definitions to debug a program as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

As used herein, the term "or" is inclusive unless otherwise explicitly noted. Thus, the phrase "at least one of A, B, or C" is satisfied by any element from the set {A, B, C} or any combination thereof, including multiples of any element.

What is claimed is:

1. A method of debugging comprising:
   determining a set of variables of a program that can have values at least similar to a plurality of target values, wherein the plurality of target values is based, at least in part, on output of the program;
   instrumenting the program to indicate when at least a first variable of the set of variables changes value;
   determining that the plurality of target values is indicated by at least a subset of the set of variables in response to an indication that that first variable of the set of variables has changed value; and
   in response to determining that the plurality of target values is indicated by the subset of variables, indicating a location within the program corresponding to when the plurality of target values is indicated by the subset of variables.

2. The method of claim 1, wherein determining that the plurality of target values is indicated by at least a subset of the set of variables in response to an indication that that first variable of the set of variables has changed value comprises:
   comparing the plurality of target values to the set of variables in accordance with a specified match threshold; and
   determining that each target value of the plurality of target values matches at least one variable in the set of variables.

3. The method of claim 2, wherein the specified match threshold comprises at least one of an exact match threshold, a similar match threshold, or a contains match threshold.

4. The method of claim 1, wherein determining the set of variables of a program that can have values at least similar to the plurality of target values comprises determining variables in the program that have data types similar to data types of the plurality of target values.

5. The method of claim 1, wherein instrumenting the program to indicate when at least a first variable of the set of variables changes value comprises:
   interpreting source code of the program to identify portions that affect the first variable of the set of variables; and
   modifying the identified portions of the source code to include an operation for indicating that the first variable has changed value.

6. The method of claim 5, wherein the operation for indicating that the first variable has changed value comprises recording a changed value of the first variable in a table which indicates values of the set of variables.

7. The method of claim 1, wherein instrumenting the program to indicate when at least a first variable of the set of variables changes value comprises:
   monitoring execution of an executable binary based, at least in part, on the program; and
   in response to detecting a change to the first variable, inserting in the executable binary an operation for indicating that the first variable has changed value.

8. The method of claim 1, wherein indicating the location within the program corresponding to when the plurality of target values is indicated by the subset of variables comprises inserting a breakpoint in source code of the program at a position corresponding to the location within the program.

9. A machine-readable storage medium having program code stored therein, the program code to:
   determine data types corresponding to a plurality of target values; and
   as variables in a program are encountered during running of the program,
   monitor variables in the program that are of a similar data type to one of the data types corresponding to the plurality of target values to detect changes;
   compare values of the monitored variables to the plurality of target values in response to detecting changes in the monitored variables;
   determine whether the values of the monitored variables indicate the plurality of target values based, at least in part, on comparing the values of the monitored variables to the plurality of target values; and in response to a determination that the values of the monitored variables indicate the plurality of target values, halt running of the program at a location corresponding to a state of the program when the values of the monitored variables indicate the plurality of target values.

10. An apparatus comprising:

a processor; and a machine-readable medium having program code executable by the processor to cause the apparatus to, determine data types corresponding to a plurality of target values; and as variables in a program are encountered during running of the program, monitor variables in the program that are of a similar data type to one of the data types corresponding to the plurality of target values to detect changes;

compare values of the monitored variables to the plurality of target values in response to detecting changes in the monitored variables;

determine whether the values of the monitored variables indicate the plurality of target values based, at least in part, on comparing the values of the monitored variables to the plurality of target values; and in response to a determination that the values of the monitored variables indicate the plurality of target values, halt running of the program at a location corresponding to a state of the program when the values of the monitored variables indicate the plurality of target values.

11. The apparatus of claim 10, wherein the program code executable by the processor to cause the apparatus to monitor the variables in the program comprises program code executable by the processor to cause the apparatus to maintain the values of the monitored variables in a data structure used for the comparing.

12. The apparatus of claim 11, wherein each entry in the data structure comprises a field to indicate a change to a value in the entry.

13. The apparatus of claim 11, wherein each entry in the data structure comprises a field to indicate that a value in the entry matches one of the plurality of target values.

14. The apparatus of claim 10 further comprising program code executable by the processor to cause the apparatus to, prior to running the program, identify variables to be monitored in the program.

15. The apparatus of claim 14 further comprising program code executable by the processor to cause the apparatus to instrument the program to indicate when each of the identified variables changes value.

16. The apparatus of claim 14, wherein the program code executable by the processor to cause the apparatus to identify the variables to be monitored comprises program code executable by the processor to cause the apparatus to identify variables in the program that have data types similar to data types of the plurality of target values.

17. The apparatus of claim 10, wherein the program code executable by the processor to cause the apparatus to compare the values of the monitored variables to the plurality of target values comprises program code executable by the processor to cause the apparatus to compare the values of the monitored variables to the plurality of target values according to a specified comparison type.

18. The apparatus of claim 10, wherein the plurality of target values were generated by the program in a previous run.

19. The apparatus of claim 10 further comprising program code executable by the processor to cause the apparatus to determine a program state definition for halting running of the program, wherein the program state definition at least indicates the plurality of target values.

20. The apparatus of claim 10, wherein the program code executable by the processor to cause the apparatus to halt running of the program at the location corresponding to the state of the program when the values of the monitored variables indicate the plurality of target values comprises program code executable by the processor to cause the apparatus to halt running of the program at the location corresponding to the state of the program when the values the monitored variables indicate the plurality of target values and when the variables are in scope.

* * * * *